(12) United States Patent
Allison et al.

(10) Patent No.: US 6,901,262 B2
(45) Date of Patent: May 31, 2005

(54) METHODS AND SYSTEMS FOR PROVIDING MOBILE SUBSCRIBER SURVEILLANCE

(75) Inventors: Rick L. Allison, Apex, NC (US); Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 125 days.

(21) Appl. No.: 10/115,350

(22) Filed: Apr. 3, 2002

(65) Prior Publication Data

US 2004/0203849 A1 Oct. 14, 2004

(51) Int. Cl.[7] .............................. H04Q 7/20; G01S 3/02; A61B 5/02
(52) U.S. Cl. ....................... 455/456.1; 342/457; 600/504
(58) Field of Search ............................... 455/456.1, 456, 455/457; 342/457, 450; 600/504

(56) References Cited

U.S. PATENT DOCUMENTS

| | | | | |
|---|---|---|---|---|
| 5,228,449 A | * | 7/1993 | Christ et al. | 600/504 |
| 6,236,365 B1 | * | 5/2001 | LeBlanc et al. | 342/457 |
| 2004/0203849 A1 | * | 10/2004 | Allison et al. | 455/456.1 |

OTHER PUBLICATIONS

ETSI, "Digital Cellular Telecommunications System (Phase2+); Location Services (LCS); (Functional Description)—Stage 2," Global System for Mobile Communications, p. 1–109, (2001).

ETSI, "Digital Cellular Telecommunications System (Phase2+); Location Services (LCS); Mobile Station (MS)—Serving Mobile Location Centre (SMLC) Radio Resource LCS Protocol (RRLP)," Global System for Mobile Communications, p. 1–52, (2000).

* cited by examiner

Primary Examiner—William D. Cumming
(74) Attorney, Agent, or Firm—Jenkins, Wilson & Taylor, P.A.

(57) ABSTRACT

Methods and systems for providing mobile subscriber surveillance identify certain call signaling messages as candidate messages for mobile subscriber surveillance. From the candidate messages, messages associated with mobile subscribers under surveillance are identified. Mobile subscriber location information is obtained for the messages associated with the mobile subscribers under surveillance. The location information is forwarded to a surveillance center, such as a state or federal law enforcement or security agency. The original call signaling messages are forwarded to their intended destinations so that surveillance is performed transparently to the mobile subscriber under surveillance.

40 Claims, 8 Drawing Sheets

METHODS AND SYSTEMS FOR PROVIDING MOBILE SUBSCRIBER SURVEILLANCE

TECHNICAL FIELD

The present invention relates to methods and systems for providing mobile subscriber surveillance. More particularly, the present invention relates to methods and systems for obtaining and delivering mobile subscriber geographic location information to a government agency or other appropriate party for surveillance purposes in a manner transparent to the mobile subscriber under surveillance.

BACKGROUND ART

Within wireless communications networks, such as global system for mobile communication (GSM) networks, universal mobile telecommunications system (UMTS) networks, general packet radio service (GPRS) networks, IS-41 networks, personal communications system (PCS) networks, etc., signaling messages are used to convey location information associated with mobile subscribers. Both implicit and explicit location information may be communicated via such signaling messages. For example, in a typical GSM network, a mobile application part (MAP) UpdateLocation message is used to convey location information to a mobile subscriber's home location register (HLR). In this case, the location information may be a serving mobile switching center (MSC) address and/or a serving visitor location register (VLR) identifier.

Advances in satellite-based global positioning system (GPS), timing advance (TA), and terrestrial-based enhanced observed time difference (E-OTD) position fixing technology enable a precise determination of the geographic position (e.g., latitude and longitude) of a mobile subscriber. As geographic location services are deployed within wireless communications networks, such positional information may be stored in network elements and delivered to nodes in the network using signaling messages. Such information may be stored in HLRs, VLRs, and special purpose mobile subscriber location databases. One example of a special purpose mobile subscriber location database is the mobile location center (MLC) proposed by the European Telecommunications Standards Institute (ETSI). In particular, ETSI has defined a signaling protocol for communicating mobile subscriber positional information to and from an MLC. This signaling protocol is referred to as the radio resource location services protocol (RRLP) and defines signaling messages communicated between a mobile station and a serving MLC related to a mobile subscriber's location. A detailed description of the RRLP protocol is found in 3GPP TS 44.031 v4.2.0 (2001-09) $3^{rd}$ Generation Partnership Project; Technical Specification Group GSM Edge Radio Access Network; Location Services (LCS); Mobile Station (MS)—Serving Mobile Location Centre (SMLC) Radio Resource LCS Protocol (RRLP) (Release 4), the disclosure of which is incorporated herein by reference in its entirety.

FIG. 1 illustrates an exemplary wireless communications network, generally indicated by reference numeral 100. In FIG. 1, wireless communications network 100 includes a mobile station (MS) 110, a base station (BS) 112, a mobile switching center (MSC) co-located with a VLR 114, a signaling network 116, and an MLC 118. As indicated in FIG. 1, signaling messages employing the RRLP protocol may be communicated between MLC 118 and MS 110 via signaling network 116. The particular RRLP messaging transaction illustrated in FIG. 1 includes an RRLP_MeasurePositionRequest message originated by MLC 118. The purpose of this message is to request that mobile station 110 provide position information. The RRLP_Measure_Position Request message is routed via signaling network 116, MSC/VLR 114, and BS 112 to destination MS 110. MS 110, in turn, takes a position measurement and returns the position information via an RRLP_MeasurePositionResponse message. The RRLP_MeasurePositionResponse message is routed to MLC 118 via signaling network 116. MLC 118 receives the message, parses out the position information, and stores the information in a database local to MLC 118.

While the RRLP protocol specification describes messaging for requesting mobile subscriber location information from a mobile station or handset and for communicating that information to an MLC, there is no mechanism described therein for placing a specific mobile subscriber under surveillance or for automatically notifying an enforcement agency of the location of mobile subscriber under surveillance. Moreover, conventional telephony-based surveillance techniques have resulted in delays in call setup that may inform the mobile subscriber that he or she is under surveillance. Once the mobile subscriber knows he or she is under surveillance, the surveillance is of little value to the enforcement or security agency performing the surveillance. Accordingly, there exists a long-felt need for improved methods and systems for mobile subscriber surveillance.

DISCLOSURE OF THE INVENTION

The present invention includes methods and systems for automatically notifying an appropriate entity, such as a state or federal law enforcement agency, of the location of a mobile subscriber that has been placed under surveillance. According to one aspect, the present invention includes a network node that identifies mobile call signaling messages associated with a mobile subscriber under surveillance, extracts mobile subscriber location information from the mobile call signaling messages, and forwards the location information to the appropriate entity.

The network node may be dedicated to performing such surveillance processing, or surveillance processing may be incorporated as a subsystem within an existing network node, such as a signal transfer point (STP), SS7-over-IP signaling gateway (SG), SIP proxy server, H.323 gatekeeper, or mobile services node (e.g., home location register, visitor location register, short message service center, voice mail service center, mobile location center, etc.).

According to another aspect of the invention, a network element may receive or intercept certain mobile signaling messages indicative of the movement of a mobile subscriber within a wireless communications network. In response to these messages, the network element may query a mobile subscriber location database, such as an MLC. The MLC may either forward the mobile subscriber location information to the querying node or deliver the information directly to the agency or entity that placed the mobile subscriber under surveillance. If the response is sent back to the querying node, the querying node may relay the message to the agency.

Accordingly, it is an object of the present invention to provide a signaling network element that automatically notifies a surveillance authority of the location of a mobile subscriber that has been placed under surveillance.

It is another object of the present invention to provide a signaling network element that formulates mobile subscriber location database queries in response to a predetermined trigger, such as movement of a mobile subscriber under surveillance.

It is another object of the invention to provide methods and systems for performing mobile subscriber surveillances in a manner that is transparent to the mobile subscriber under surveillance.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of preferred embodiments of the present invention will now proceed with reference to the accompanying drawings, of which.

DETAILED DESCRIPTION OF THE INVENTION

Figure 2:
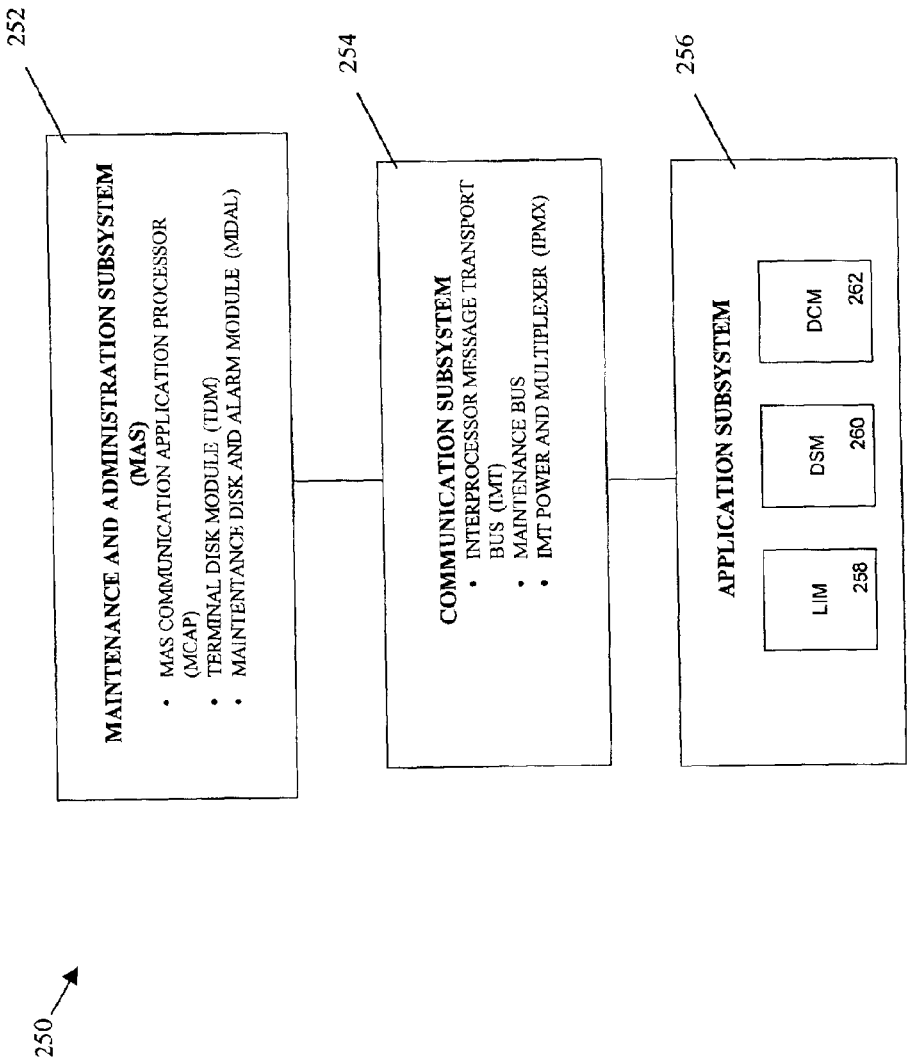
FIG. 2 is a block diagram illustrating a conventional signaling gateway routing node.

Disclosed herein are several embodiments of the present invention, that may include an underlying hardware platform similar to that of a telecommunications network routing node, such as a signal transfer point, a signaling gateway, or other node capable of routing call signaling messages. As used herein, the term "signaling gateway" refers to a packet routing node capable of routing call signaling messages between nodes of different protocols, such as signaling system 7 (SS7) nodes and IP-based signaling nodes (e.g., signaling nodes that communicate via SUA/M2UA/M3UA/ SCTP, SIP/SDP, TALI, H.323, or other packet telephony protocol). Exemplary hardware platforms suitable for use with embodiments of the present invention include high performance STP and SG platforms marketed by the assignee of the present application as the Eagle® STP and IP⁷® Secure Gateway, respectively. FIG. 2 is a block diagram illustrating the base internal architecture of a signaling gateway platform suitable for use with embodiments of the present invention. A detailed description of the IP⁷® Secure Gateway is found in Feature Notice IP⁷ Secure Gateway™ Release 1.0 PN/909-0767-01, Rev B, August 1999, published by Tekelec of Calabasas, Calif., the disclosure of which is incorporated herein by reference in its entirety. Similarly, a detailed description of the Eagle® STP is found in the Eagle® Feature Guide PN/910-1225-01, Rev. B, January 1998, the disclosure of which is incorporated herein by reference in its entirety.

As described in the above referenced Feature Notice and as illustrated in FIG. 2, an IP⁷® Secure Gateway 250 includes the following subsystems: a maintenance and administration subsystem (MAS) 252, a communication subsystem 254 and an application subsystem 256. MAS 252 provides maintenance communications, program load, peripheral services, alarm processing and system disks. Communication subsystem 254 includes an interprocessor message transport (IMT) bus that is the main communication bus among all subsystems in the IP⁷® Secure Gateway 250. This high-speed communications system includes two 1 Gbps counter-rotating serial buses.

Application subsystem 256 includes application cards capable of communicating with the other cards through the IMT buses. Numerous types of application cards can be incorporated into SG 250, including: a link interface module (LIM) 258 that provides SS7 links and X.25 links, and a database service module (DSM) 260 that may be configured to provide SCCP service and higher layer services that require a database, such as global title translation, TCAP services, MAP services, INAP services, number portability services, etc.

A data communications module (DCM) 262 sends signaling messages to and receives signaling messages from external devices, such as IP signaling points or database nodes, via an IP signaling link. Accordingly, DCM 262 may include a TCP/IP protocol stack or a UDP/IP protocol stack for transferring such messages. In addition, if the signaling protocol is not compatible with TCP/IP or UDP/IP, DCM 262 may translate between TCP/IP or UDP/IP and the signaling protocol. For example, if the signaling protocol is SS7, which includes its own protocol stack, DCM 262 may translate between the lower layers of SS7 and TCP/IP or UDP/IP. A detailed description of exemplary functionality of DCM 262 can be found in PCT Publication No. WO 00/35155, the disclosure of which is incorporated herein by reference in its entirety.

In order to transport SS7 call signaling messages over an IP network, DCM 262 may implement Tekelec's transport adapter layer interface (TALI), as described in IETF RFC 3094, "Tekelec's Transport Adapter Layer Interface," (April 2001), the disclosure of which is incorporated herein by reference it its entirety. Alternatively, DCM 262 may implement one or more signaling user adaptation layers, such as M3UA, as described in IETF Internet draft: draft-ietf-sigtran-m3ua-12.txt, February 2002, the disclosure of which is incorporated herein by reference in its entirety, and the stream control transmission protocol, as described in IETF RFC 2960: "Stream Control Transmission Protocol," the disclosure of which is incorporated herein by reference in its entirety.

Triggerless Location Notification Routing Node Embodiment

Figure 1:
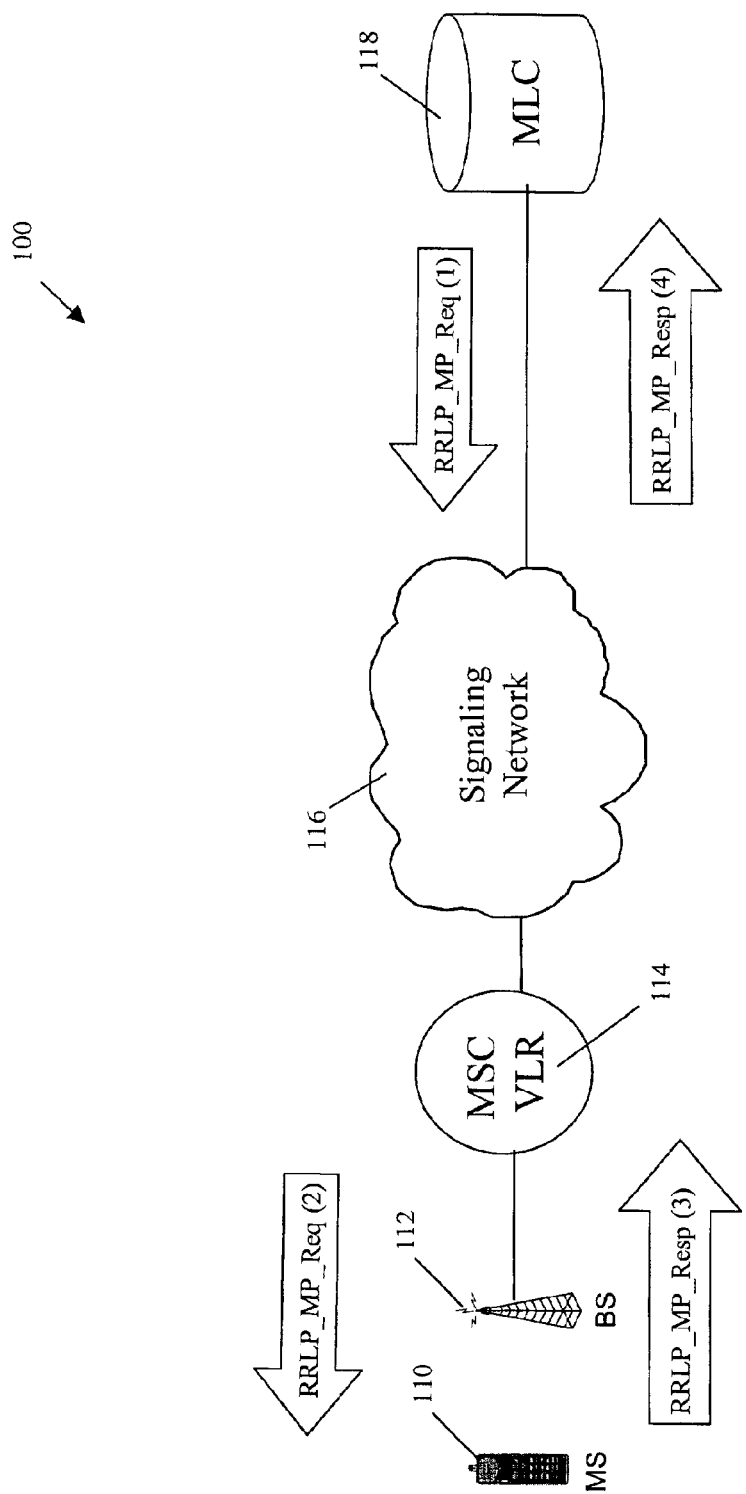
FIG. 1 is a network diagram illustrating RRLP signaling between a mobile station and a mobile location center.
Figure 3:
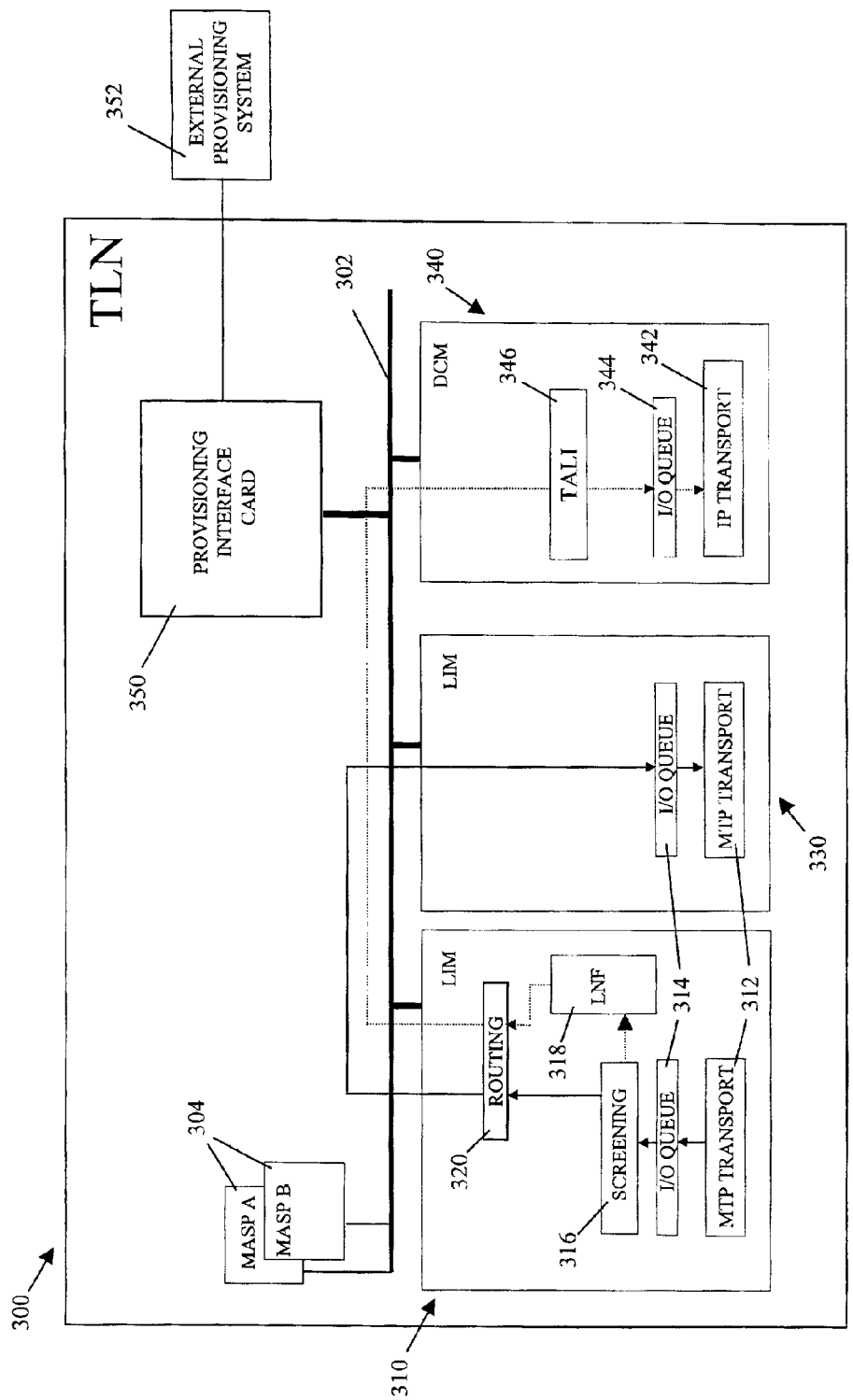
FIG. 3 is a block diagram of a signaling routing node including a location notification subsystem according to an embodiment of the present invention.

FIG. 3 illustrates a triggerless location notification (TLN) routing node 300 including automatic mobile subscriber location identification and notification functionality according to an embodiment of the present invention. In FIG. 3, TLN routing node 300 includes an interprocessor message transport (IMT) bus 302 that is the main communication bus among internal modules, processors and subsystems. In one embodiment, this high-speed communications system may include two 1 Gbps counter-rotating serial buses. A number of modules or circuit boards may be coupled to IMT bus 302. In FIG. 1, these modules include a pair of maintenance and administration subsystem processors (MASPs) 304, a first SS7-capable link Interface module 310, a second SS7-capable LIM 330, an Internet protocol-capable data communication module 340, and a provisioning interface module 350. These modules are physically connected to IMT bus 302 such that signaling and other types of messages may be routed internally between active cards or modules. Multiple DCMs, LIMs, DSMs, or other processing modules may be included in TLN routing node 300 and connected to IMT bus 302 without departing from the scope of the invention.

MASP pair 304 provide maintenance communications, initial program load, peripheral services, alarm processing and system disks. Because MASP pair 304 is not essential in describing TLN routing node functionality, a detailed discussion of their design and operation is not provided herein. A more comprehensive discussion of additional MASP operations and functionality is provided in the above-referenced Tekelec IP[7]® Secure Gateway and Eagle® STP publications.

As described above, a LIM transmits and receives SS7 message signaling units (MSUs) via one or more SS7 signaling links. In the embodiment illustrated in FIG. 3, LIM 310 is includes a lower level message transfer part (MTP) transport module 312, generally corresponding to MTP protocol layers 1 and 2, an I/O buffer or queue 314, a message screening or discrimination module 316, a location notification module 318, and a routing module 320. MTP transport module 312 provides the facilities necessary to send and receive digital data over a particular physical medium and also provides error detection, error correction, and sequenced delivery of SS7 messages. I/O queue 314 buffers incoming and outgoing signaling message packets. Screening module 316 performs message discrimination functions, such as determining whether an incoming SS7 message requires internal processing or is simply to be through switched, i.e., routed to another node.

While the example illustrated in FIG. 1 illustrates only a single screening module 316 and a single location notification module 318 present on LIM 310, it is understood that each communications module that receives signaling messages from external signaling links may include such modules. For example, in FIG. 3, LIM 330 and DCM 340 may also include screening and location notification modules. In an alternate embodiment, each LIM and DCM card may include a screening module and the location notification module may be located on a DSM card (not shown in FIG. 3).

In one embodiment of the present invention, screening module 316 may examine one or more parameters in a received signaling message in order to determine whether the message triggers mobile subscriber surveillance processing. That is, screening module 316 may determine whether a signaling message is a candidate message for surveillance processing. Such LN-related signaling message parameters examined by screening module 316 may include any appropriate SS7 message parameters, such as a service indicator octet (SIO), a destination point code (DPC) network address value, a signaling connection control part (SCCP) subsystem number (SSN), an origination point code (OPC) network address value, a global title indicator (GTI), a translation type (TT), a numbering plan (NP) value, a nature of address indicator (NAI), and/or a message type identifier.

In a preferred embodiment, LN candidate screening may be performed primarily on or include mobile application part (MAP) message type or opcode. That is, a MAP message type or opcode parameter contained in a received signaling message is decoded and examined to determine whether the message is of a type that is indicative of the movement or location of a mobile subscriber or mobile station within a wireless network. Examples of such MAP message types include signaling messages that are designated or classified as mobility service messages in ETSI TS 100 974 v7.9.0 (2001-09) Digital cellular telecommunications system (Phase 2+); Mobile Application Part (MAP) Specification (3GPP TS 09.02 version 7.9.0 Release 1998, the disclosure of which is incorporated herein by reference in its entirety). As defined in this specification, mobility service messages include location management service messages, paging and search services, subscriber management services, and identity management services. MAP-specific mobility service messages may include UpdateLocation, CancelLocation, Sendidentification, and other messages. A complete listing and detailed description of these messages may be found in the above-referenced ETSI standards document.

In addition to MAP mobility service messages, LN message type candidate screening may also include identifying certain radio access network location services messages, such as MeasurePositionResponse messages. While LCS messages may not necessarily be indicative of movement within a wireless network, these signaling messages may contain explicit geographic location information, such as GPS data or E-OTD data, associated with a mobile subscriber or mobile station. Such location information may be of interest to an agency that has placed a mobile subscriber under surveillance.

LN message type candidate screening may also include identifying certain general packet radio service (GPRS) mobility management messages, such as AttachRequest messages or other messages described in ETSI TS 124 008 v3.2.1 (2000-01) Digital cellular telecommunications system (Phase 2+(GSM); Universal Mobile Telecommunications System (UMTS); Mobile radio interface layer 3 specification, Core Network protocols—Stage 3 (3G TS 24.008 version 3.2.1 Release 1999, the disclosure of which is incorporated herein by reference in its entirety). Such messages may be sent by a mobile subscriber through a signaling network and may include information indicative of a mobile subscriber's location. For instance, the GPRS AttachRequest-AttachAccept message sequence includes mobile subscriber identification information (e.g., an international mobile subscriber identifier or IMSI), old routing area identification, and new routing area identification information. Such information may be used by a TLN routing node of the present invention to notify a surveillance center of a mobile subscriber's previous and present location.

In the context of conventional STP or SG routing node operations, LN candidate screening may be performed as a subset or sub-function of gateway screening. Performing LN candidate screening as a subset of gateway screening increases the speed at which surveillance candidate messages can be identified since gateway screening is typically one of the first operations performed on received signaling messages. Received signaling messages that satisfy one or more of the LN candidate screening criteria may be passed directly to the associated LN function 318, or a copy of the signaling message may be generated and subsequently passed to the LN function for further processing. For purposes of illustration, the descriptions of LN processing presented herein assume that LN function 318 receives and processes a copy of the LN candidate signaling message.

While the LN candidate screening criteria discussed above are relevant to SS7-based signaling networks, other non-SS7 signaling network protocols may require the use of different LN candidate screening parameters. For example, in an Internet protocol-based signaling network, an origination or destination IP address, a uniform resource locator (URL), or a non-SS7/MAP protocol signaling message type value may be used to accomplish LN candidate screening. Again, the present invention may utilize any suitable signaling protocol message indicative of the movement or location of a mobile subscriber or mobile station within a wireless network.

LN function 318 may receive a candidate message from screening module 316 and further examine certain parameters included within the message to determine whether the candidate message contains information that warrants the notification of a surveillance authority, such as a federal or state law enforcement or security agency. In one embodiment, LN function 318 may decode portions of a received candidate message in order to identify one or more mobile subscribers or mobile stations associated with the message. In the SS7 signaling protocol, such information may be included within the SCCP layer of a signaling message. For example, the called or calling party address parameter in the SCCP portion of a signaling message may include IMSI, MSISDN, or other parameters that may be used to identify a called or calling mobile subscriber. In GSM wireless networks, additional information may also be contained within the higher protocol layers of certain mobility management and mobile services signaling messages. For instance, the MAP protocol, which uses the services of the SCCP and transaction capabilities application part (TCAP) protocol layers, may also contain information sufficient to identify one or more of the mobile subscribers or mobile stations associated with a given signaling transaction. Table 1 shown below illustrates exemplary mobile subscriber surveillance criteria that may be used by LN function 318 to identify mobile subscribers or mobile stations.

TABLE 1

Mobile Subscriber Surveillance Criteria

| IMSI | Mobile Subscriber ISDN | Surveillance Center Address |
|---|---|---|
| 9193457018 | 9192339807 | 1-2-2 |
| 2024453045 | 2027678987 | 102.2.2.3 |
| 7074679302 | 7078839393 | 103.2.3.4 |
| 7074679302 | 7072772282 | 103.2.3.4 |

As illustrated in Table 1, IMSIs, MSISDNs, or a combination thereof may be used to identify a particular mobile subscriber or mobile station that has been placed under surveillance by a surveillance authority. A data structure, similar in information content to that shown in Table 1, may be accessible by LN function 318 in order to identify mobile stations or subscribers that have been placed under surveillance and also to identify the particular surveillance center that is interested in tracking a given mobile subscriber. The surveillance center address information may be used during LN processing to address a location notification message to the appropriate surveillance center. Consequently, once LN function 318 has decoded a received candidate message, LN function 318 extracts a mobile subscriber or mobile station identifier, such as an IMSI, an MSISDN, a mobile directory number, an electronic mail address, an IP address, or other appropriate identifier, from the message and compares the value with values in Table 1 to determine whether the mobile subscriber or mobile station associated with the candidate message is currently under surveillance.

The mobile subscriber surveillance list may be periodically updated or modified via provisioning interface 350 and associated external provisioning system 352. External provisioning system 352 may be accessible by authorized surveillance center personnel, authorized telecommunications service provider personnel, or both surveillance center and telecommunications service provider personnel. If external provisioning system 352 is accessible by surveillance center personnel, external provisioning system 352 may include a secure network interface, such as an HTTPS interface, that allows surveillance center personnel to access and modify the surveillance information. If external provisioning system 352 is accessible only by authorized mobile telecommunications service provider personnel, the surveillance center may simply provide the name of a subscriber to be placed under surveillance to the service provider, and the service provider may input the appropriate information into external provisioning system 352. In any event, mobile subscriber surveillance "watch list" information is received at TLN routing node 300 via provisioning interface 350, which in turn distributes the received information to the LN function residing on each communication module (e.g., LIM, DCM) coupled to IMT bus 302.

Once LN function 318 detects a message that contains location information, and identifies the message as being associated with a mobile subscriber under surveillance, in one embodiment, LN function 318 addresses the message to the appropriate surveillance center and passes the message to routing module 320. Routing module 320 receives messages from screening module 316 and LN module 318 and routes the messages to the appropriate communication module based on routing information contained in the message. A single LIM or DCM communication module may support multiple signaling link ports. Consequently, in certain cases, routing module 320 may simply route a message from one signaling link port to another signaling link port on the same communication module.

In FIG. 3, data communications module 340 is connected to IMT bus 302. Data communications module 340 includes an IP transport function 342 for providing the services typically associated with OSI layers 1 through 4. For example, IP transport function may include a PHY/framer chip that implements a physical layer, such as an Ethernet or SONET layer, a datalink layer, such as HDLC. With regard to OSI layer 3 and 4 services, IP function 342 may include hardware or software that implements a network layer, such as Internet protocol and a transport layer, such as transmission control protocol or user datagram protocol. I/O queue 344 provides for temporary buffering of incoming and outgoing signaling message packets.

DCM 340 may include a transport adapter layer interface 346 for translating between SS7 and IP addressing schemes. In one embodiment, interface 346 packages SS7 ISDN user part, SS7 transaction capabilities application part, mobile application part, and other signaling protocol components within a transport protocol layer that is suitable for communication through an IP network. Exemplary translation protocols that may be used include the above-described TALI, signaling user adapter, and SCTP protocols. In an embodiment of the invention in which DCM 340 uses the TALI protocol, the OSI layer 3 and 4 transport protocol implemented by IP transport module 342 is preferably TCP. If a signaling adapter layer and SCTP are used, the transport layer may be omitted, since SCTP is designed to run directly on top of a network layer protocol, such as IP.

Triggerless Location Notification Routing Node Operation

A TLN routing node may use certain signaling messages as surveillance update or location notification "triggers." A routing node that automatically initiates surveillance processing based on theses messages is referred to herein as a triggerless location notification routing node because an explicit surveillance message or trigger from another node is not required.

Figure 4:
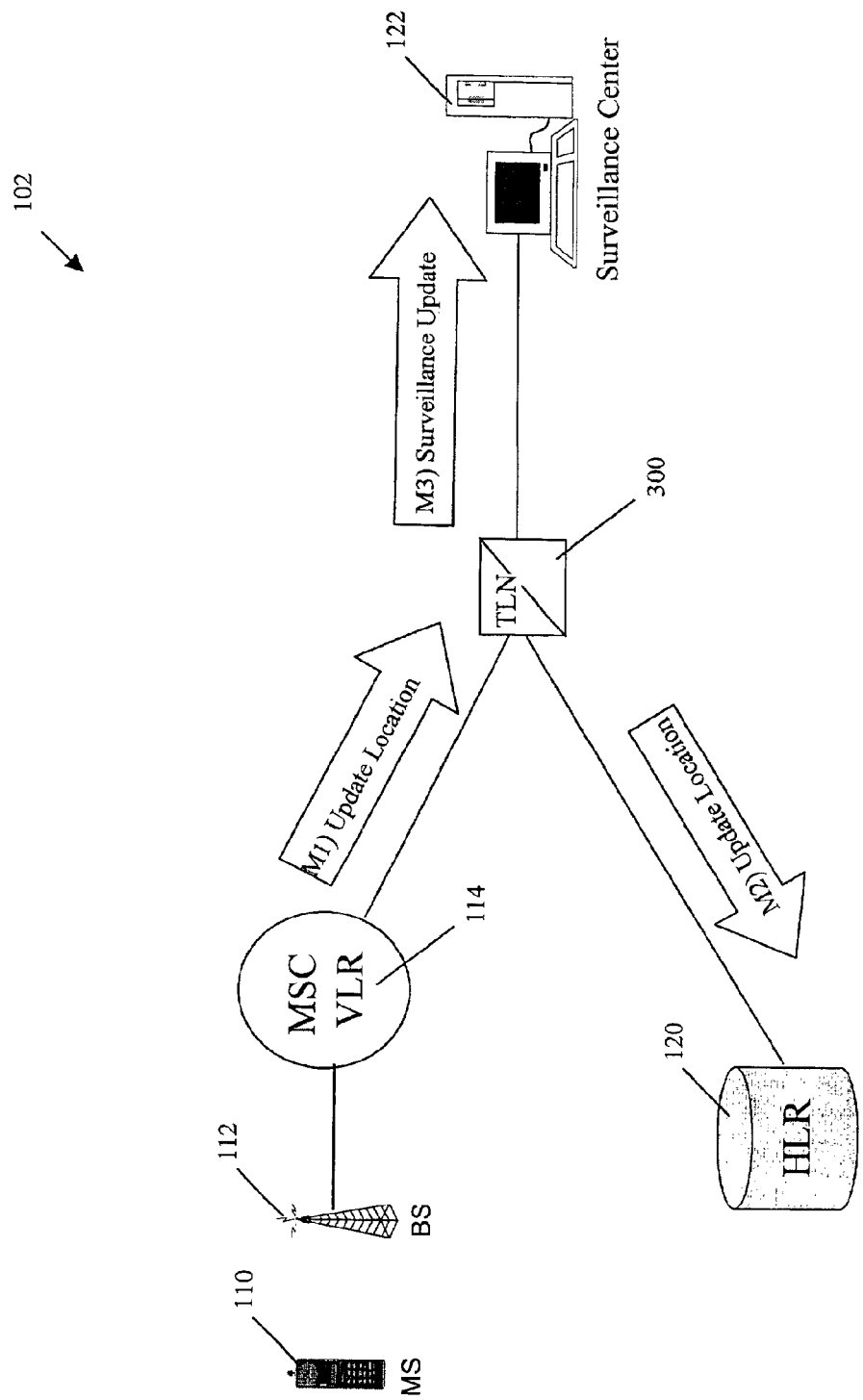
FIG. 4 is a network diagram illustrating message flows in a network including the location notification subsystem embodiment illustrated in FIG. 3.
Figure 5:
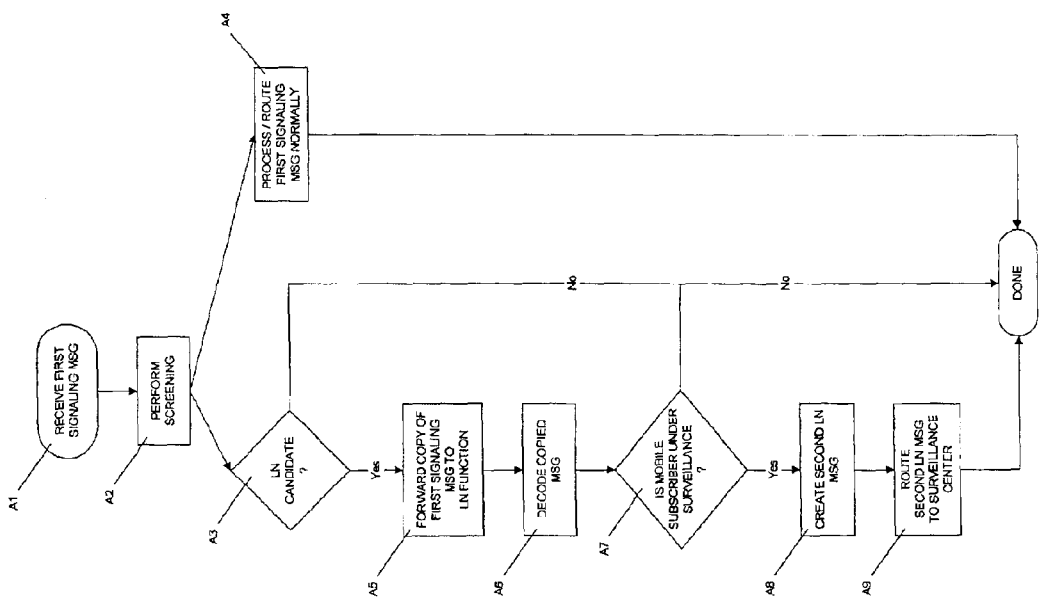
FIG. 5 is a process flow diagram associated with the location notification subsystem illustrated in FIG. 3.

FIG. 4 is a network diagram and FIG. 5 is a flow chart illustrating exemplary operations of a TLN routing node according to an embodiment of the present invention. FIG. 4 illustrates a GSM network generally indicated by the numeral 102. In the illustrated example, GSM network 102 includes a mobile subscriber or mobile station 110, a base station 112, a mobile switching center/visitor location register 114, a home location register 120, a surveillance center 122, and a TLN routing node 300. The example message flow scenario shown in FIG. 4 involves a GSM MAP UpdateLocation message, which is typically used by a visitor location register (VLR) to update mobile subscriber location information in a mobile subscriber's home location register. More particularly, MSC/VLR 114 generates and transmits a MAP UpdateLocation message M1 into the signaling network. The transmitted MAP message M1 is received at TLN routing node 300 via LIM 310 illustrated in FIG. 3.

FIG. 5 illustrates the processing of the message after it is received by TLN routing node 310. In step A1, signaling message M1 is received at LIM 310. Lower layer MTP protocol processing is performed on the incoming message by MTP transport module 312, and the message is subsequently passed to screening module 316 where LN candidate screening is performed (step A2). With particular regard to LN candidate screening operations, in one embodiment of the invention, the MAP opcode parameter contained in the received signaling message is decoded and examined to determine the type of MAP message contained in the signaling message packet (step A3). If the MAP opcode indicates that the received signaling message is a MAP UpdateLocation message, then a copy of at least a portion of the received signaling message is generated and passed to the LIM-resident LN function 318 for further processing (step A5). In addition to LN candidate screening, other types of screening, such as gateway screening and SCCP message discrimination, may also be performed by screening process 316. In the event that the received signaling message passes these other types of screening, the original received message may be processed and routed in a manner that is typical of STP or SG operations. In the present example, the original received MAP UpdateLocation message is passed from screening module 316 to routing module 320 (step A4), as indicated by the solid arrow in FIG. 3. Routing module 320 decodes and examines routing label information (e.g., SS7 point code, subsystem) in the signaling message and routes the message to the appropriate signaling link for transmission to or towards a destination node. In the example presented in FIG. 3, routing module 320 determines that the signaling message should be directed to a signaling link resident on LIM 330, and consequently the message is communicated via IMT bus 302 to LIM 330 where the message is transmitted into the signaling network 102. From the illustration in FIG. 4, it will be appreciated that the signaling message M2 transmitted from LIM 330 is subsequently received and processed by HLR 120.

Because the original message is routed to its intended destination, mobile communications service to the mobile subscriber under surveillance continues. In other words, the surveillance processing performed according to the present invention is transparent to the mobile subscriber. As a result, the surveillance is more likely to be effective.

Returning to step A5 of FIG. 5, the copy of the original MAP UpdateLocation is received by LN function 318. LN function 318 may decode and examine certain information in the forwarded message (step A6). For example, LN function 318 may decode and examine called or calling party address information contained in an SCCP layer of the UpdateLocation message. The LN function may also decode and examine mobile subscriber or mobile station identification information that is contained within a MAP layer of the UpdateLocation message. Table 2 shown below illustrates the structure of the MAP UpdateLocation message defined in the above-referenced ETSI MAP specification.

TABLE 2

MAP UpdateLocation Message Structure

| Parameter | Request | Indication | Response | Confirm |
|---|---|---|---|---|
| Invoke ID | M | M(=) | M(=) | M(=) |
| IMSI | M | M(=) | | |
| MSC Address | M | M(=) | | |
| VLR Number | M | M(=) | | |
| LMSI | U | C | | |
| HLR Number | | | C | C(=) |
| User Error | | | C | C(=) |
| Provider Error | | | | O |

In Table 2, "M" indicates a mandatory parameter, "(=)" indicates that the parameter takes the same value as the parameter immediately to its left, "C" indicates a conditional parameter, "O" indicates a parameter that is a service provider option, and "U" indicates a MAP user option. The columns in Table 2 to the right of the parameter column represent the different MAP update location service messages type. In Table 2, the types listed are: request, indication, response, and confirm. MAP UpdateLocation messaging is a confirmed service, which requires several individual messages to complete a transaction. Of particular interest with regard to the present invention are the MAP update location request and indication messages, since these messages include a number of parameters that may be used to provide the LN function. More particularly, an IMSI parameter, a mobile switching center (MSC) address parameter, a VLR number, and a LMSI parameter may be extracted from a received MAP update location request or confirm message and used to determine whether a mobile subscriber is under surveillance. An IMSI and/or LMSI may be used to identify a mobile subscriber or mobile station that is currently roaming within a mobile network. Furthermore, the associated MSC address and/or VLR number parameters may be used to determine the location of the roaming mobile subscriber within the network. Consequently, such messages may serve as triggers for a location notification or surveillance update. With respect to the discussion that follows, the term "MAP UpdateLocation message" is intended to include both Request and Indication versions of the message.

In the present example, an IMSI value is decoded and extracted from the MAP UpdateLocation signaling message. The IMSI value is used to search a table or data structure containing mobile subscriber/station "watch list" information similar to that described above and shown in Table 1 (step A7). Once again, LN function 318 includes or has access to a table or database of mobile subscribers or mobile stations under surveillance. This table or database may include a list of mobile subscriber MSISDN, IMSI, temporary IMSI, electronic mail address or other functionally equivalent identifiers associated with mobile subscribers or mobile stations that have been placed under surveillance.

If no matching IMSI entry is located in the watch list table, LN processing is terminated. If a matching IMSI is encountered in the watch list table, indicating that the MAP UpdateLocation message is associated with mobile station that has been placed under surveillance, LN function 318 may generate a new message. This new message is referred to herein as a location notification or surveillance update message, and is denoted as message M3 in FIG. 4.

In one embodiment, the IMSI, LMSI, MSC address, and VLR number information may be included in a location notification message generated by LN function 318 and routed to a surveillance center (step A9) using surveillance center address information obtained from Table 1. The location notification message may include the mobile subscriber or mobile station information and associated location information in a TCAP payload component of an SS7 signaling message. In another embodiment, this information may be communicated to a surveillance center using a non-SS7 protocol, such as file transfer protocol (FTP), secure hypertext transfer protocol (HTTPS), or other appropriate data transfer protocol, via an IP network.

Continuing with the MAP UpdateLocation message example, once LN module 318 has processed the MAP UpdateLocation message, the resulting location notification message produced by the LN function is passed to routing module 320 located on LIM 310. Routing module 320 applies routing rules and directs the location notification message to an outbound communication module for transmission to or towards surveillance center 122. In the present example, routing module 320 directs the location notification message to DCM 340 via IMT bus 302, as indicated by the dotted arrow in FIG. 3. The location notification message may be processed by TALI function 346 and IP transport function 342 prior to transmission to surveillance center node 122 via an IP communication link. For example, TALI function 346 may add a TALI header to the message, and IP transport function may add TCP and IP header to the message before it is sent to surveillance center 122. Alternatively, since the location update message is not required to perform a call signaling function, TALI processing may be bypassed, and the mobile subscriber location and identification information may be included in an appropriate file transfer protocol message, which may be encapsulated in a TCP segment or UDP datagram, and sent to the surveillance center via the IP network.

Surveillance center node 122 may receive the location notification message M3 and extract the mobile subscriber and/or mobile station identification information as well as the associated location information. Thus, the embodiment illustrated in FIG. 3 automatically identifies call signaling messages associated with subscribers under surveillance, extracts the location information, and provides the location information to a surveillance center without requiring a query from the surveillance center. Because the location information is extracted automatically based on call signaling messages, the location information provided to the surveillance center is likely to be current. In addition, because such functionality can be integrated with gateway screening functionality in a signal transfer point or signaling gateway, the time required to identify location messages with subscribers under surveillance is reduced.

Another advantage of such TLN functionality relates to the fact that not all mobile subscribers or mobile stations may necessarily have their location information stored in an MLC node. Unless such location data warehousing is mandatory (i.e., required by law), some mobile subscribers may not wish to have their exact whereabouts maintained in such location databases. Also, it is reasonable to assume that those mobile subscribers that are engaged in illegal activities will certainly resist or subvert any attempts to store their location data in a location database. Consequently, an automatic or triggerless location notification system that relies completely on MLC stored data may not provide the degree of surveillance coverage required by law enforcement and security authorities. It is the intent of the TLN routing node embodiment to ensure that location notification or surveillance updates are provided to a surveillance center regardless of whether a "tracked" mobile subscriber has MLC service.

In the embodiment illustrated in FIG. 3, the TLN routing node identifies a MAP signaling message associated with a subscriber under surveillance and extracts location information from the MAP message. In an alternate embodiment or in addition to MAP-based identification, a TLN routing node may intercept and process LCS messages, such as those described in the above-referenced LCS or RRLP protocol specifications. One RRLP message that may be intercepted and processed by a TLN routing node according to the invention may include an RRLP MeasurePositionResponse message, which contains geographic location information associated with a mobile subscriber. Table 3 shown below illustrates exemplary elements that may be included in an RRLP MeasurePositionResponse message.

TABLE 3

RRLP MeasurePositionResponse Message Structure

Element

Multiple Sets
Reference BTS Identity
E-OTD Measurement Info
Location Information In Table 3, the various information elements may contain information that may be extracted by a triggerless location notification routing node according to an embodiment of the present invention. For example, the E-OTD measurement information element provides OTD measurements of signals sent from the reference and neighbor base stations. This information element can contain location information, such as the identification of the target base station, the neighbor base station, the target cell, and the neighbor cell. In addition, signal quality information regarding communication channels with the target and neighbor base stations can be communicated in this parameter. The sub-fields of the E-OTD measurement information element may be communicated directly to the surveillance center. Alternatively, the sub-fields may be used to derive an exact location of the mobile subscriber, using known location identification techniques, such as triangulation.

Another element of the RRLP measurement position response message that may be used to communicate mobile subscriber location information to a surveillance center is the location information element. The location information element provides a location estimate communicated by the mobile station to the network. Alternatively, the location information element may contain velocity parameters recorded by the mobile station. The information provided in the location information element may be used in addition to the E-OTD measurement information to pinpoint the location of the mobile subscriber under surveillance.

Yet another field in the RRLP measurement position response message that may be used to communicate location information to a surveillance center is the GPS measurement information element. The purpose of the GPS measurement information element is to provide GPS measurement information from the mobile station to the SMLC. This information includes the measurement of code phase and Doppler, which allows the SMLC to compute the location of the mobile subscriber using GPS methods. The information in this field may be communicated to a surveillance center and the surveillance center may compute the mobile subscriber's location using GPS methods.

TLN message screening and processing operations with respect to an RRLP MeasurePositionResponse message are similar to those operations previously described for a MAP UpdateLocation message. In this case, mobile subscriber identification information (e.g., IMSI, MSISDN, IP address, etc.) may be examined and/or extracted from an SCCP or MAP layer in a received LCS message, along with location information (e.g., E-OTD Measurement Info data, GPS Measurement Info data, Location Info data) from the RRLP portion of the message. This information may be included in a location notification message that is generated by LN function 318 and routed to a surveillance center (step A9). As described previously, the location notification message may include the mobile subscriber or mobile station and associated location information in a TCAP payload component of an SS7 signaling message, or this information may be communicated to a surveillance center in a non-SS7 protocol such as file transfer protocol (FTP) via an IP network (e.g., TCP/IP, UDP/IP, etc.).

In addition to the STP and SG routing node embodiments described above, such "triggerless" location notification functionality may be incorporated within a number of existing network elements including: a mobile switching center, a GPRS support node, a home location register, a visitor location register, or a mobile location center. For example, screening module 316, location notification module 318, and the associated surveillance database may be implemented as computer programs and data that can be stored on any suitable node that processes mobile call signaling messages. However, placing this functionality on a routing node is particularly advantageous, since most of the call signaling messages in a mobile communications network are required to pass through the routing node.

Triggerless Location Notification LCS Client Embodiment

Figure 6:
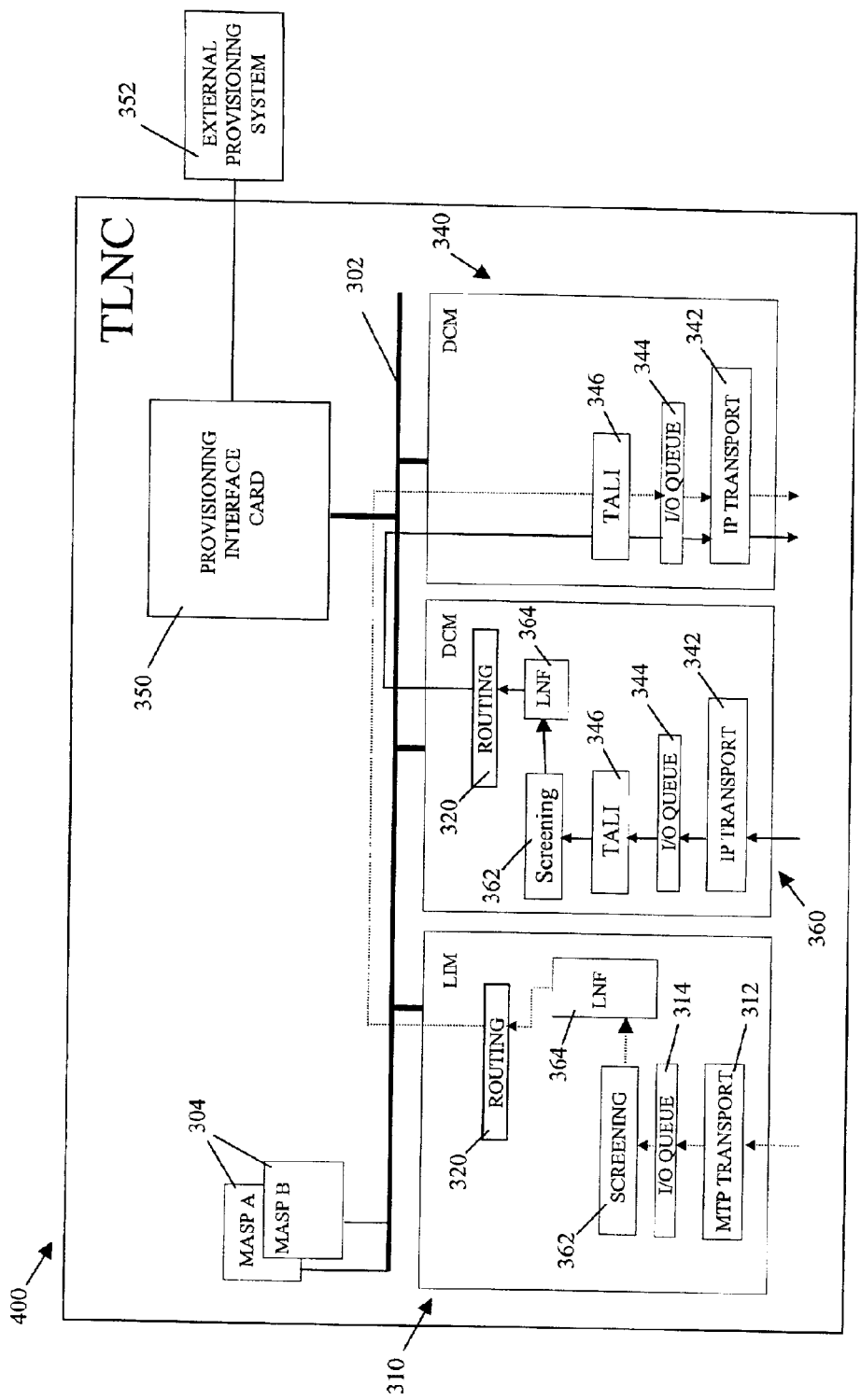
FIG. 6 is a block diagram of a signaling routing node including a location notification subsystem according to an alternate embodiment of the invention.
Figure 7:
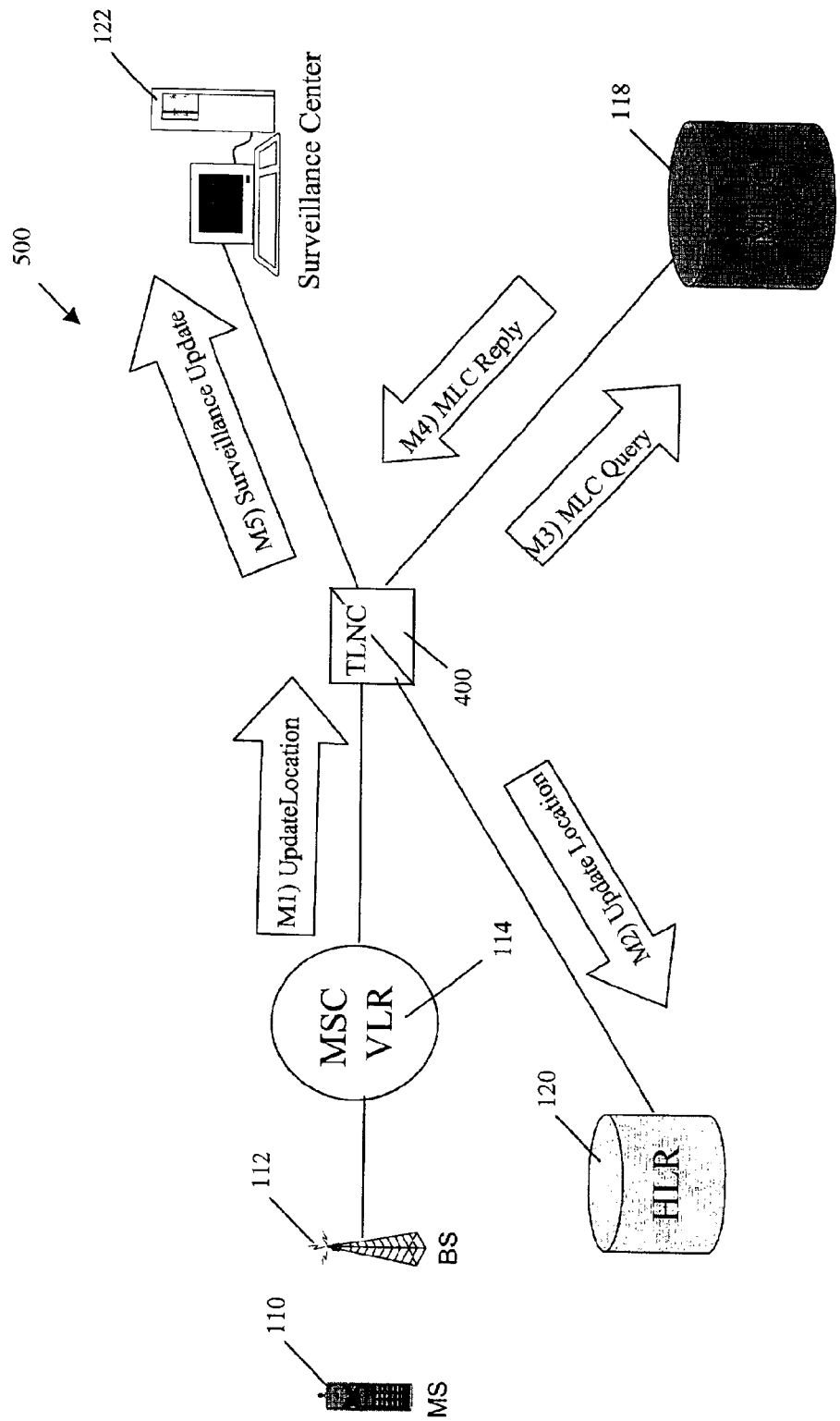
FIG. 7 is a network diagram illustrating message flows in a network including the location notification subsystem embodiment illustrated in FIG. 6.
Figure 8:
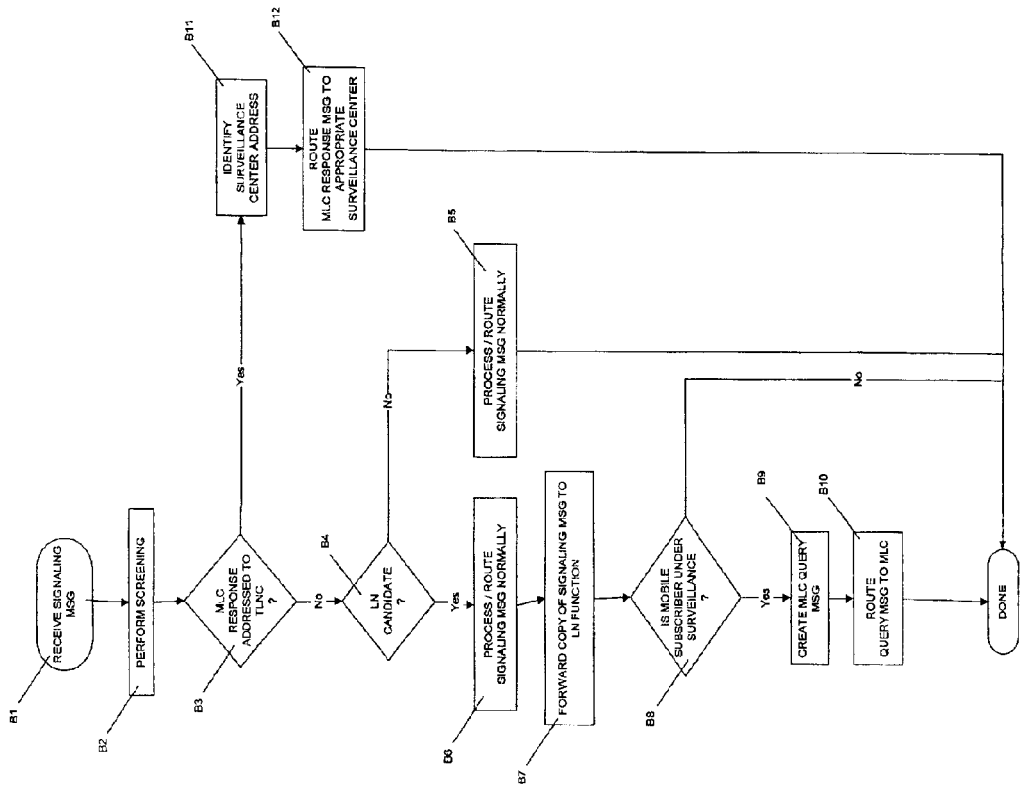
FIG. 8 is a process flow diagram associated with the location notification subsystem illustrated in FIG. 6.

FIGS. 6 through 8 illustrate an alternate embodiment of the present invention, referred to herein as a triggerless location notification location services client (TLNC) node. Like the TLN routing node described above, a TLNC node of the present invention may be incorporated within a number of existing network elements including: a mobile switching center, a GPRS support node, an SS7 signal transfer point, an SS7/IP signaling gateway, a SIP proxy server, an H.323 gatekeeper/gateway node, a home location register, a visitor location register, or a mobile location center. For purposes of illustration, an SS7 STP or SS7/IP SG-like TLNC routing node embodiment is described below.

A TLNC routing node embodiment of the present invention achieves the objective of automatically providing a surveillance center with mobile subscriber location updates in a different manner from that of the TLN routing node embodiment described above. While a TLNC routing node of the present invention may respond to the same LN or surveillance update "triggers" as a TLN node, the TLNC may also query a mobile subscriber location database server such as a mobile location center (MLC) or serving mobile location center (SMLC). This MLC querying is performed on behalf of a surveillance center node, and the TLNC node may relay the query result to the interested surveillance center. As such, a TLNC node may include some functionality similar to that of a location services (LCS) client that queries an LCS server. Exemplary LCS client/server interaction is described in ETSI TS 101 724 v8.4.0 (2001-12) Digital cellular telecommunications system (Phase 2+); Location Services (LCS); Functional Description; Stage 2 (3GPP TS 3.71 version 8.4.0 Release 1999), the disclosure of which is incorporated herein by reference in its entirety.

FIG. 6 illustrates a TLNC routing node according to an embodiment of the present invention, generally indicated by reference numeral 400. The basic architecture and functionality of the core components of TLNC node 400 is similar to the corresponding components of TLN routing node 300 described above. In the illustrated example, TLNC node 400 includes LIM 310 and DCM 340, and an additional DCM 360. TLNC node 304 also includes a pair of MASP processors 304, an IMT bus 302, a provisioning interface module 350, and an external provisioning system 352, all of which operate in a manner similar to that described above.

Screening function 362 shown on LIM 310 and DCM 360 may provide the same services as the screening function described above and may also identify mobile location database reply messages. Such mobile location database reply messages may be directed to LN function 364 for further processing. LN function 364 that is shown on LIM 310 and DCM 360 may provide the same services as the LN function described above and may also generate a mobile location database query message, such as a LocationServiceRequest message. A mobile location database reply message, such as a LocationServiceResponse message, received from screening function 362 may be forwarded to a surveillance center, or may be used to create a new message, which is in turn forwarded to a surveillance center. Table 4 shown below includes a sample data structure and sample data that may be used by LN function 364 to determine whether a received message is associated with a mobile subscriber that is under surveillance.

TABLE 4

Mobile Subscriber Surveillance Data

| IMSI | Mobile Subscriber ISDN | SMLC or GMLC Address | Surveillance Center Address |
|---|---|---|---|
| 9193457018 | 9192339807 | 3-2-1 | 101.1.1.2 |
| 2024453045 | 2027678987 | 1-2-3 | 7-7-7 |
| 7074679302 | 7078839393 | 3-3-3 | 103.2.3.4 |
| 7074679302 | 7072772282 | 3-3-3 | 103.2.3.4 |

As with the previous embodiment, Table 4 includes IMSI and MSISDN mobile subscriber identifiers that are associated with mobile subscribers or mobile stations that have been placed under surveillance. Surveillance center address information is again included for use in the routing of location update messages. Such surveillance center address information may be in the form of an SS7 network address, an Internet protocol address, a URL, etc. Network address information associated with a serving mobile location center (SMLC) or gateway mobile location center (GMLC) may also be stored and/or accessed by LN function 364. Such SMLC/GMLC address information may be used by the TLNC node to more efficiently route LCS query messages to the appropriate MLC entity. For example, an LCS Location-ServiceRequest message may be generated by LN function 364 and routed to a GMLC node, where further routing decisions are performed in order to direct the message to the appropriate SMLC node.

Triggerless Location Notification LCS Client Operation

A process flow diagram and sample network message flow diagram associated with the operation of the TLNC routing node embodiment presented in FIG. 6 are illustrated in FIGS. 7 and 8, respectively. FIG. 7 illustrates a GSM network generally indicated by reference numeral 500. In the illustrated example, GSM network 500 includes a mobile subscriber or mobile station 110, a base station 112, a mobile switching center/visitor location register 114, a home location register 120, a surveillance center 122, a mobile location service center 118, and a TLNC routing node 400. Again, the example message flow scenario shown in FIG. 7 involves a GSM MAP UpdateLocation message, which is typically used by a visitor location register (VLR) to update mobile subscriber location information in a mobile subscriber's home location register (HLR). More particularly, MSC/VLR 114 generates and transmits a MAP UpdateLocation message M1 into the signaling network. The transmitted MAP message M1 is received at TLNC routing node 400 via LIM 310, as generally indicated in FIGS. 6 and 7.

As described in the associated process flow diagram shown in FIG. 8, a signaling message M1 is received at LIM 310 in step B1. Lower layer MTP protocol processing is performed on the incoming message by MTP transport module 312, and the message is subsequently passed to screening process 316 where LN candidate screening is performed (step B2). With particular regard to LN candidate screening operations, in one embodiment a message operation code or message type parameter contained in the received signaling message is decoded and examined to determine the type of message contained in the signaling message packet (step B3). Once again, other types of screening, such as gateway screening and SCCP message discrimination may also be performed by screening module 316.

In the case of message M1 received by LIM 310, the message is identified as a MAP UpdateLocation message (not an MLC query message) and is subsequently examined to determine whether the message may be a potential LN trigger candidate (B4). As previously described, a MAP UpdateLocation message is a potential LN trigger candidate, and as such, a copy of the UpdateLocation message is created. The original message is through-switched or processed and routed in a manner that is typical of STP or SG operation (steps B6 and B7). As indicated in FIG. 7, the "original" UpdateLocation message M2 is routed to destination HLR 120. In the event that a message is determined not to be a potential LN trigger candidate, then the message is simply through-switched or processed and routed in a manner that is typical of STP or SG operations (step B5).

As indicated by the dashed message flow line in FIG. 6, the UpdateLocation message copy is passed to LN function 364 on LIM 310. The LN function may decode and examine certain information in the forwarded message (step B8). For example, LN function 364 may decode and examine called or calling party address information contained in an SCCP layer of the UpdateLocation message. The LN function may also decode and examine mobile subscriber or mobile station identification information that is contained within a MAP layer of the UpdateLocation message. Table 2 above illustrates the parameter structure of several MAP Update-Location signaling messages as defined in the above-referenced ETSI MAP specification and information that may be used to identify a mobile subscriber and his or her location.

In the present example, an IMSI value is decoded and extracted from the MAP UpdateLocation signaling message, and this IMSI value is subsequently used to search a table or data structure containing mobile subscriber/station "watch list" information similar to that illustrated above in Table 1 (step B8). Once again, LN function 364 includes or has access to a table of mobile subscribers or stations under surveillance. As illustrated in Table 1, a list of mobile subscribers under surveillance may included MSISDN, IMSI, temporary IMSI, electronic mail address or other functionally equivalent identifiers associated with mobile subscribers that have been placed under surveillance.

If no matching IMSI entry is located in the "watch list" database, LN processing is terminated. If a matching IMSI is encountered in the "watch list" database, indicating that the MAP UpdateLocation message is associated with mobile station that has been placed under surveillance, LN function 364 is adapted to generate a new message. This new message is referred to herein as a location services query or mobile location center query message, and is denoted as message M3 in FIG. 7. An example of a location services query message is a LocationServiceRequest message as defined and described in the above referenced ETSI LCS functional description standard. Table 5 shown below includes a summary of information that may be contained in a typical LocationServiceRequest message.

TABLE 5

LCS LocationServiceRequest Message Structure

Element

Target Mobile Subscriber
LCS Identity
State
Event
Quality Of Service Info
Local Coordinate System
Geographical Area Once LN function 364 has processed the MAP Update-Location message copy, the resulting location services query message produced by the LN function is passed to routing process 320 located on LIM 310. Routing module 320 applies routing rules and directs the location services query message to an outbound communication module for transmission to or towards the mobile location center node 118. In the present example, routing module 320 directs the location services query message to DCM 340 via IMT bus 302, as indicated by the dotted arrow in FIG. 6. The location services query message is processed by TALI function 346 and IP transport function 342 prior to transmission to mobile location center node 118 via an IP communication link.

Mobile location center node 118 may receive the location services query message M3 sent by TLNC node 400 and reply to the TLNC node with a location services response message M4, such as an LCS LocationServiceResponse message. An LCS LocationServicesResponse message may include a number of location related parameters or information elements including, those shown in Table 6 set forth below.

TABLE 6

LCS LocationServiceResponse Message Information

Element

IMSI
MSISDN
IMEI
Current Geographic Location

Various levels of security related to location information distribution may exist within a location services system in a communication network. Consequently, a TLNC node of the present invention may be required to have sufficient LCS authorization or access privileges in order to obtain access to LCS-based location data. For example, a TLNC node may be assigned an LCS client type classification of "Lawful Intercept Service" or "Emergency Services." A TLNC node may also be registered as an LCS client at a gateway MLC, and as such the GMLC may provide the TLNC node with access to mobile subscriber location information through via "Authorized MS List" data that is maintained at the GMLC. Such authorization or access privileges may be set up in advance by a network administrator.

Returning to a discussion of the sample message flows through network 500 shown in FIG. 7, LCS reply message M4 is communicated from MLC 118 to TLNC 400. As indicated in FIG. 6, the LCS reply message (e.g., LocationServiceResponse) is received by DCM 360 and is processed by the lower layer protocol functions in a manner that is similar to that described above. As such, the received LCS reply message is processed by screening function 362. Once again following the message process diagram presented in FIG. 7, it will be appreciated that in this case, the received message M4 is an MLC response message that is addressed to the TLNC node or a subsystem of the TLNC node (step B3). As such, the MLC reply message is passed to LN function 364 on DCM 360. LN function 364 is adapted to decode and examine information contained in the MLC reply message in order to determine to which surveillance center the MLC reply message should be forwarded. In one embodiment, the LN function extracts information from the MLC reply message that identifies the targeted mobile subscriber (e.g., IMSI, MSISDN, electronic mail address, etc.). This information is subsequently used to perform a lookup in a data structure similar to that shown in Table 4, in order to obtain a network address associated with the appropriate surveillance center (step B11). The MLC reply message M5, or at least some of the information contained therein is then forwarded to or towards the destination surveillance center (step B12), where the information may be used to automatically track the movement of the targeted mobile subscriber.

Once again, in addition to the STP and SG routing node embodiments described above, such "triggerless" LCS client functionality may be incorporated within a number of existing network elements including: a mobile switching center, a GPRS support node, a home location register, a visitor location register, or a mobile location center.

Thus, the present invention automatically identifies, collects and routes mobile subscriber location information to a surveillance center. In one embodiment, the invention extracts mobile subscriber location information from location update messages without requiring a specific trigger from a mobile switching center or a mobile location center. In another embodiment, the invention formulates a mobile subscriber location query message on behalf of a surveillance center, receives a mobile subscriber location reply message, and forwards the location information from the reply message to a surveillance center. In both instances, because surveillance processing is based on call signaling messages and the original call signaling messages are forwarded to their intended destinations, surveillance occurs transparently to party under surveillance. The methods and systems described herein can be incorporated in an existing network element, such as a signal transfer point or an SS7/IP gateway. Thus, mobile subscriber location information can be communicated efficiently to a surveillance center.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for providing mobile subscriber location information to a surveillance center, the method comprising:
   (a) receiving a first signaling message in a wireless communications network;
   (b) determining whether the first message is associated with a mobile subscriber under surveillance by comparing subscriber identification information extracted from the first message with mobile subscriber surveillance watch list information stored in a database;
   (c) in response to determining that the first message is associated with a mobile subscriber under surveillance, obtaining location information regarding the mobile subscriber; and
   (d) forwarding the location information to a surveillance center.

2. The method of claim 1 wherein receiving a first message includes receiving a MAP update location message.

3. The method of claim 1 wherein receiving a first message includes receiving an RRLP measure position response message.

4. The method of claim 1 wherein receiving a first message includes receiving a GPRS mobility management message.

5. The method of claim 1 wherein determining whether the first message is associated with a mobile subscriber under surveillance includes extracting a mobile subscriber identifier from the first message and performing a lookup in a table containing identifiers associated with mobile subscribers under surveillance using the mobile subscriber identifier.

6. The method of claim 5 wherein performing a lookup using the mobile subscriber identifier comprises performing a lookup using an international mobile subscriber identifier (IMSI) extracted from the first message.

7. The method of claim 5 wherein performing a lookup using the mobile subscriber identifier comprises performing a lookup using a mobile station ISDN number (MSISDN) extracted from the first message.

8. The method of claim 5 wherein performing a lookup using the mobile subscriber identifier includes performing a lookup using an IP address extracted from the first message.

9. The method of claim 1 wherein obtaining location information includes extracting the location information from the first message.

10. The method of claim 1 wherein obtaining location information includes querying a mobile location center for the location information.

11. The method of claim 1 wherein obtaining location information includes querying an HLR for the location information.

12. The method of claim 1 wherein forwarding the location information to a surveillance center includes formulating a second message including the location information and sending the second message to the surveillance center over a network.

13. A method for providing mobile subscriber location information to a surveillance center, the method comprising:
(a) receiving a first signaling message in a wireless communications network;
(b) determining whether the first message is associated with a mobile subscriber under surveillance;
(c) in response to determining that the first message is associated with a mobile subscriber under surveillance, obtaining location information regarding the mobile subscriber;
(d) forwarding the location information to a surveillance center, wherein performing steps (b)–(d) includes copying the first message, performing steps (b)–(d) on the copied message, and forwarding the original message to its intended destination, thereby performing surveillance processing transparently to the mobile subscriber under surveillance.

14. The method of claim 1 wherein steps (a)–(d) are performed at an SS7 signal transfer point.

15. The method of claim 1 wherein steps (a)–(d) are performed at an SS7/IP gateway.

16. The method of claim 1 wherein steps (a)–(d) are performed at an HLR.

17. The method of claim 1 wherein steps (a)–(d) are performed at a mobile location center (MLC).

18. The method of claim 1 wherein steps (a)–(d) are performed at a mobile switching center (MSC).

19. The method of claim 1 wherein steps (a)–(d) are performed at a GPRS support node.

20. A triggerless location services routing node, the routing node comprising:
(a) a screening module for receiving call signaling messages and identifying call signaling messages as mobile subscriber surveillance candidate messages;
(b) a location notification module operatively associated with the screening module for receiving call signaling messages identified as surveillance candidate messages, determining whether the surveillance candidate messages are associated with mobile subscribers under surveillance, obtaining location information for the mobile subscribers under surveillance, and forwarding the location information to a surveillance center; and
(c) a mobile subscriber surveillance database associated with the location notification module for storing surveillance watch list information usable by the location notification module for identifying call signaling messages associated with mobile subscribers under surveillance.

21. The routing node of claim 20 wherein the screening module is adapted to identify MAP location update messages as mobile subscriber surveillance candidate messages.

22. The routing mode of claim 20 wherein the screening module is adapted to identify RRLP measure position response messages as mobile subscriber surveillance candidate messages.

23. The routing node of claim 20 wherein the screening module is adapted to identify GPRS mobility management messages as mobile subscriber surveillance candidate messages.

24. The routing node of claim 20 wherein the screening module is adapted to identify IS-41 registration messages as mobile subscriber surveillance candidate messages.

25. The routing node of claim 20 wherein the screening module comprises an SS7 gateway screening module.

26. A triggerless location services routing node, the routing node comprising:
(a) a screening module for receiving call signaling messages and identifying call signaling messages as mobile subscriber surveillance candidate messages;
(b) a location notification module operatively associated with the screening module for receiving call signaling messages identified as surveillance candidate messages, determining whether the surveillance candidate messages are associated with mobile subscribers under surveillance, obtaining location information for the mobile subscribers under surveillance, and forwarding the location information to a surveillance center; and
(c) a mobile subscriber surveillance database associated with the location notification module for storing information for identifying mobile subscribers under surveillance, wherein the screening module is adapted to forward the call signaling messages to their intended destinations and to forward copies of the candidate messages to the location notification module, thereby performing surveillance processing transparently to the subscribers under surveillance.

27. The routing node of claim 20 wherein the location notification module is adapted to extract mobile subscriber identification information from the call signaling messages and to perform a lookup in the mobile subscriber surveillance database to determine whether the surveillance candidate messages are associated with mobile subscribers under surveillance.

28. The routing node of claim 27 wherein the mobile subscriber identification information includes an international mobile subscriber identifier (IMSI).

29. The routing node of claim 27 wherein the mobile subscriber identification information includes a mobile station ISDN (MSISDN) number.

30. The routing node of claim 27 wherein the mobile subscriber identification information includes an IP address.

31. The routing node of claim 20 wherein the location notification module is adapted to extract or calculate the mobile subscriber location information from received mobile subscriber surveillance candidate messages associated with mobile subscribers under surveillance.

32. The routing node of claim 20 wherein the location notification module is adapted to query a mobile subscriber location database to obtain the mobile subscriber location information.

33. The routing node of claim 20 wherein the location notification module is adapted to formulate a mobile subscriber location message and forward the mobile subscriber location message to a surveillance center over a network.

34. The routing node of claim 20 wherein the mobile subscriber surveillance database includes mobile subscriber identifiers and corresponding surveillance center identifiers for mobile subscribers under surveillance.

35. The routing node of claim 34 comprising a provisioning interface for updating the mobile subscriber and surveillance center identifiers in the mobile subscriber surveillance database.

36. The routing node of claim 35 wherein the provisioning interface is accessible by authorized surveillance center personnel.

37. The routing node of claim 35 wherein the provisioning interface is accessible by authorized mobile telecommunications service provider personnel.

38. The routing node of claim 20 wherein the screening module, the location notification module, and the mobile subscriber surveillance database comprise computer programs and data stored in memory on an SS7 link interface module.

39. The routing node of claim 20 wherein the screening module, the location notification module, and the mobile subscriber surveillance database comprise computer programs and data stored in memory on an SS7/IP data communications module.

40. A signal transfer point comprising:

(a) a link interface module for sending and receiving call signaling messages in a wireless communications;

(b) a screening module operatively associated with the link interface module for identifying predetermined call signaling messages as candidate messages for mobile subscriber surveillance processing, copying the candidate messages, and forwarding the original messages to their intended destinations; and (c) a mobile subscriber location notification module operatively associated with the screening module for receiving the copied messages associated with mobile subscribers under surveillance, obtaining location information for the mobile subscribers under surveillance, and forwarding the location information to a surveillance center.

* * * * *